US012451039B2

(12) United States Patent
Ahn

(10) Patent No.: US 12,451,039 B2
(45) Date of Patent: Oct. 21, 2025

(54) DATA DRIVING DEVICE AND DATA PROCESSING DEVICE OPERATING IN LOW POWER MODE

(71) Applicant: SILICON WORKS CO., LTD., Daejeon (KR)

(72) Inventor: Yong Sung Ahn, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/891,474

(22) Filed: Aug. 19, 2022

(65) Prior Publication Data

US 2022/0392386 A1 Dec. 8, 2022

Related U.S. Application Data

(63) Continuation of application No. 17/189,627, filed on Mar. 2, 2021, now Pat. No. 11,450,254.

(30) Foreign Application Priority Data

Mar. 4, 2020 (KR) ........................ 10-2020-0027178

(51) Int. Cl.
*G09G 3/20* (2006.01)

(52) U.S. Cl.
CPC ......... *G09G 3/20* (2013.01); *G09G 2330/022* (2013.01); *G09G 2370/22* (2013.01)

(58) Field of Classification Search
None
See application file for complete search history.

(56) References Cited

U.S. PATENT DOCUMENTS

2010/0231787 A1* 9/2010 Kim ..................... G09G 3/3688 348/503
2015/0138254 A1* 5/2015 Nakayama ............ G06F 1/3265 345/690
2015/0310824 A1* 10/2015 Yang ...................... G09G 5/006 345/213
2017/0193892 A1* 7/2017 Ha ....................... G09G 3/2022
2018/0114483 A1* 4/2018 Kim ..................... H10K 59/353
2019/0197979 A1 6/2019 Kim et al.
2020/0042264 A1* 2/2020 Zheng .................... G09G 5/005

FOREIGN PATENT DOCUMENTS

KR 10-2016-0004899 A 1/2016
KR 10-2019-0079284 A 7/2019

* cited by examiner

*Primary Examiner* — Nicholas J Lee
(74) *Attorney, Agent, or Firm* — ROTHWELL, FIGG, ERNST & MANBECK, P.C.

(57) ABSTRACT

A data driving device and a data processing device may reduce the amount of consumed power by being standing by for data transmission or data reception in a low-power mode.

15 Claims, 7 Drawing Sheets

DATA DRIVING DEVICE AND DATA PROCESSING DEVICE OPERATING IN LOW POWER MODE

CROSS REFERENCE TO RELATED APPLICATION

This application is a continuation of U.S. patent application Ser. No. 17/189,627 filed on Mar. 2, 2021 which claims priority from Republic of Korea Patent Application No. 10-2020-0027178, filed on Mar. 4, 2020, each of which is hereby incorporated by reference in its entirety.

BACKGROUND

1. Field of Technology

The present disclosure relates to a data driving device and a data processing device which operate in a low-power mode.

2. Description of the Prior Art

A display device may include a panel and a panel driving device that drives the panel. The panel may include a plurality of pixels, which are disposed alongside each other in the vertical direction and the horizontal direction and form a matrix, and the plurality of disposed pixels may be located, like a matrix, on a panel.

The panel driving device may drive the pixels of the panel. The panel driving device may include a data driving device and a data processing device. The data driving device may determine a data voltage depending on image data, and may provide the data voltage to the pixels so as to drive the panel. The data processing device may receive image data from a host, may process the image data so that the data driving device determines a data voltage, and may transmit the processed image data to the data driving device. The image data is transmitted as a digital value, and the data driving device may convert the image data into an analog voltage so as to drive each pixel.

The image data may be transmitted from the data processing device to the data driving device. Here, the data processing device may be a transmission end and the data driving device may be a reception end. Here, in order to receive the image data, the data driving device, which is the reception end, may always operate so as to receive a signal. That is, the data driving device may always consume power since the data driving device needs to be standing by for receiving image data. This may cause the reception end to consume power. In the same manner, in order to transmit image data, the data processing device, which is the transmission end, may always operate so as to transmit a signal. That is, the data processing device may always consume power since the data processing device needs to be standing by for transmitting image data. This may cause the transmission end to consume power.

SUMMARY

Therefore, the embodiments are to provide a technology associated with an operation method that reduces the amount of power consumed by the data driving device, which is the reception end, and the data processing device, which is the transmission end.

An aspect of the embodiments is to provide a data driving device that is standing by for data reception in a low-power mode, and a data processing device that is standing by for data transmission in a low-power mode.

Another aspect of the embodiment is to provide a data driving device and a data processing device that enters a low-power mode or a normal mode depending on a wakeup-on signal or a wakeup-off signal.

In accordance with an aspect of the present disclosure, a data driving device which receives data may include: a control circuit configured to operate in a low-power mode while reception of the data is not performed, to enter a normal mode so as to receive the data, and to enter the low-power mode again when the reception of the data is complete; a training circuit configured to train a signal including a test clock in the normal mode; and a receiving circuit configured to receive the data when the training is complete.

In the device, the control circuit may maintain the low-power mode while not receiving the data, may enter the normal mode when the reception of the data begins, may maintain the normal mode until the reception of the data is complete, and may enter the low-power mode again when the reception of the data is complete.

In the device, the training circuit may produce a lock-on signal indicating that training of the test clock is complete, or a lock-off signal indicating unlocking, and performs training again when producing the lock-off signal.

In the device, the control circuit may enter the low-power mode while not receiving the data upon receiving a wakeup-on signal, and may enter the normal mode from the low-power mode upon receiving a wakeup-off signal.

In the device, the wakeup-on signal and the wakeup-off signal may include a plurality of logic levels different from each other, and may be transmitted in a single communication line, and the data may be a clock-embedded differential signal and may be transmitted via a plurality of communication lines.

In the device, the receiving circuit may perform communication according to a differential scheme via two communication lines in the normal mode, and may receive a logic level signal via one of the two communication lines in the low-power mode.

In the device, the receiving circuit may transmit an embedded clock via the two communication lines in the normal mode, may include a clock recovery circuit for recovering the embedded clock, and may drive the clock recovery circuit using a low power in the low-power mode.

In the device, when data corresponding to an amount of one frame is received in the normal mode, the control circuit may determine that data reception is completed, and may enter the low-power mode again.

In accordance with another aspect of the present disclosure, a data processing device which transmits data, may include: a control circuit configured to operate in a low-power mode while transmission of the data is not performed, to enter a normal mode in order to transmit the data, and to enter the low-power mode again when the transmission of the data is complete; a receiving circuit configured to receive a result of training of a signal including a test clock in the normal mode; and a transmitting circuit configured to transmit the data in the normal mode.

In the device, the control circuit may maintain the low-power mode while not transmitting the data, may enter the normal mode when the transmission of the data begins, may maintain the normal mode until the transmission of the data is complete, and may enter the low-power mode again when the transmission of the data is complete.

In the device, the transmitting circuit may perform communication according to a differential scheme via two communication lines in the normal mode, and may transmit a logic level signal via one of the two communication lines in the low-power mode.

In the device, the control circuit may enter the low-power mode while not transmitting the data upon receiving a wakeup-on signal, and may enter the normal mode from the low-power mode upon receiving a wakeup-off signal.

In the device the wakeup-on signal and the wakeup-off signal may include a plurality of logic levels different from each other, and may be transmitted via a single communication line, and the data may be a clock-embedded differential signal, and may be transmitted via a plurality of communication lines.

In the device, the transmitting circuit may transmit a signal that enables or disables a low-power mode of the data driving device.

In the device, the training result may include a lock-on signal indicating that training of the test clock is complete or a lock-off signal indicating unlocking, and if the training result includes the lock-off signal, the receiving circuit may receive a training result again.

According to the above-described embodiments, the data driving device and the data processing device may be standing by for data transmission or reception in a low-power mode and may reduce the amount of power consumed.

DETAILED DESCRIPTION

Figure 1:
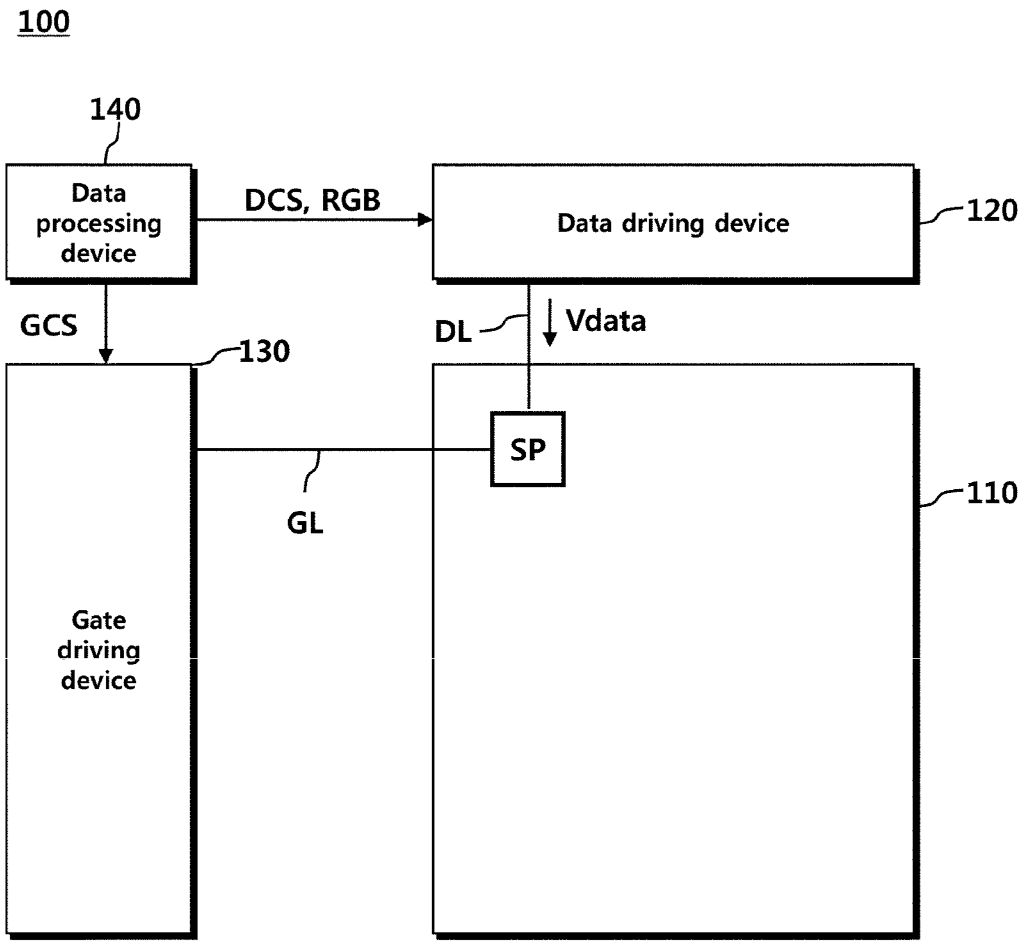
FIG. 1 is a diagram illustrating the configuration of a display device according to an embodiment.

FIG. 1 is a diagram illustrating the configuration of a display device 100 according to an embodiment.

Referring to FIG. 1, a display device 100 may include a panel 110, a data driving device 120, a gate driving device 130, a data processing device 140, and the like.

In the panel 110, a plurality of data lines (DL) and a plurality of gate lines (GL) may be disposed, and a plurality of pixels may be disposed. A pixel may include a plurality of sub-pixels. Here, a sub-pixel may be red (R), green (G), blue (B), white (W), and the like. A single pixel may include sub-pixels (SP) of RGB, SPs of RGBG, SPs of RGBW, or the like. Hereinafter, for ease of description, it is illustrated that a single pixel includes sub-pixels of RGB.

The data driving device 120, the gate driving device 130, and the data processing device 140 may be devices which produce signals in order to display an image on the panel 110.

The gate driving device 130 may supply a gate driving signal of a turn-on voltage or a turn-off voltage to a gate line (GL). If a gate driving signal of a turn-on voltage is supplied to a sub-pixel (SP), the sub-pixel (SP) is connected to a data line (DL). If a gate driving signal of a turn-off voltage is supplied to a sub-pixel (SP), the connection between the sub-pixel (SP) and the data line (DL) is disconnected. The gate driving device 130 may be referred to as a gate driver.

The data driving device 120 may supply a data voltage (Vdata) to a sub-pixel (SP) via a data line (DL). The data voltage (Vdata) supplied via the data line (DL) may be supplied to a sub-pixel (SP) according to a gate driving signal. The data driving device 120 may be referred to as a source driver.

The data driving device 120 may produce a plurality of gamma voltages, and may output a data voltage (Vdata) corresponding to image data (RGB) among the plurality of gamma voltages. The data driving device 120 may include a digital-analog converter and a buffer. In response to the image data (RGB), the digital-analog converter may select one of the plurality of gamma voltages, and may output the one selected voltage to the buffer. The buffer may amplify the one selected voltage and may provide a data voltage (Vdata) to a sub-pixel (SP) via a data line (DL).

The data driving device 120 may include at least one integrated circuit, and the at least one integrated circuit may be connected to a bonding pad of the panel 110 in a manner of a tape automated bonding (TAB) type or a chip on glass (COG) type, may be directly disposed on the panel 110, or may be integrated with the panel 110 depending on an embodiment. In addition, the data driving device 120 may be implemented in a manner of a chip on film (COF) type.

The data processing device 140 may supply a control signal to the gate driving device 130 and the data driving device 120. For example, the data processing device 140 may transmit a gate control signal (GCS), which enables scanning, to the gate driving device 130. The data processing device 140 may output image data to the data driving device 120. In addition, the data processing device 140 may transmit a data control signal which performs control so that the data driving device 120 supplies a data voltage (Vdata) to each sub-pixel (SP). The data processing device 140 may be referred to as a timing control circuit.

Figure 2:
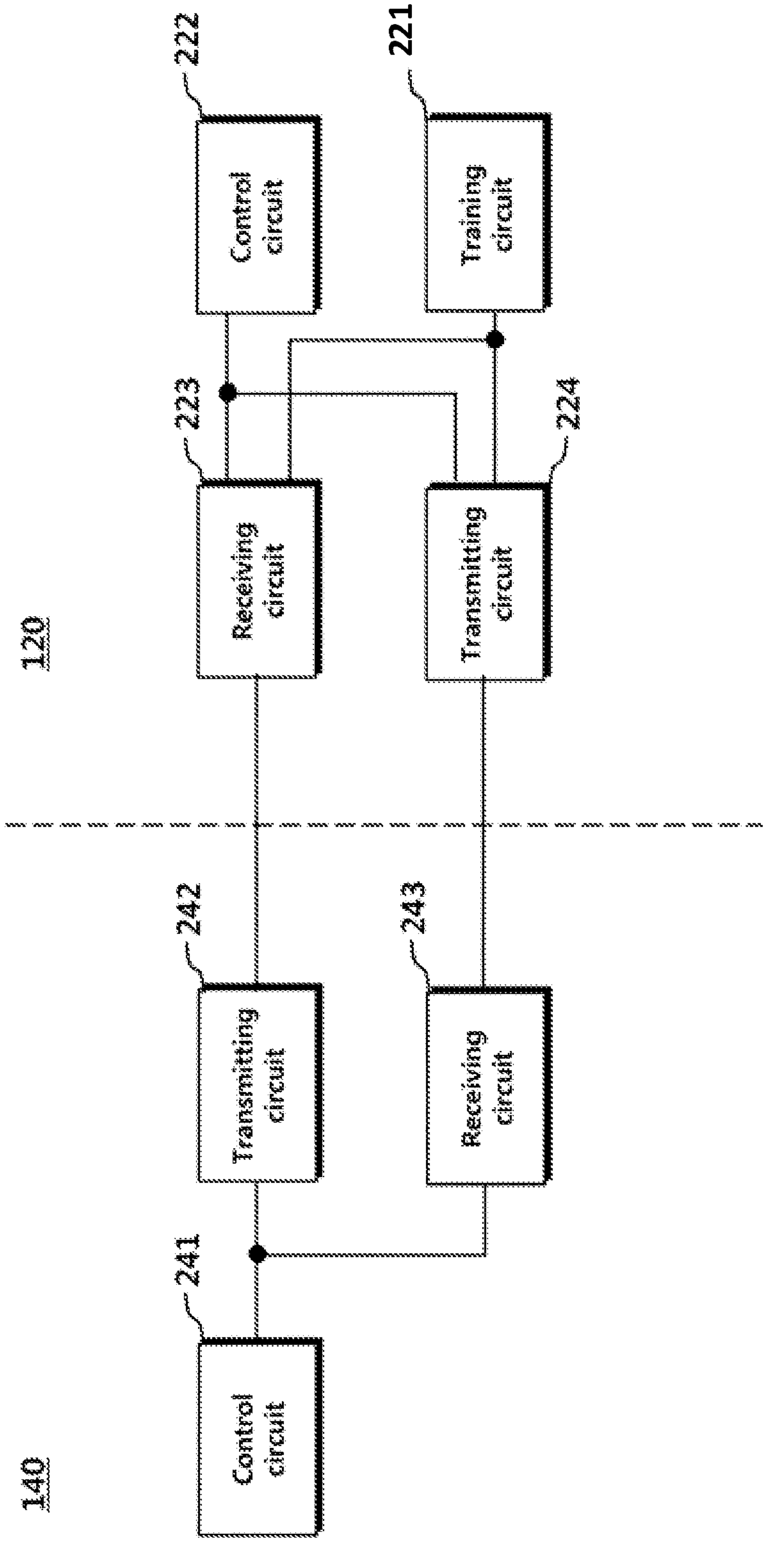
FIG. 2 is a diagram illustrating the configuration of a data driving device and a data processing device according to an embodiment.

FIG. 2 is a diagram illustrating the configuration of a data driving device 120 and a data processing device 140 according to an embodiment.

Referring to FIG. 2, the data driving device 120 may include a training circuit 221, a control circuit 222, a receiving circuit 223, and a transmitting circuit 224.

The control circuit 222 of the data driving device 120 may operate in a low-power mode while not receiving image data. Subsequently, the control circuit 222 may enter a normal mode from the low-power mode, in order to receive image data. When the reception of the image data is complete, the control circuit 222 may enter the low-power mode again.

Upon receiving a wakeup-on signal, the control circuit 222 may enter the low-power mode from an off-mode. Upon receiving a wakeup-off signal, the control circuit 222 may enter the normal mode from the low-power mode.

Here, the off-mode may be the state in which power is not supplied to the data driving device 120 and the data driving device 120 is turned off, or may be the state in which only power which enables the minimum operation of the data driving device 120 is supplied before high-speed image data reception.

A wakeup-on signal may enable the data driving device 120 in the off-mode to operate in the low-power mode. A wakeup-off signal may enable the data driving device 120 in the low-power mode to operate in the normal mode. The wakeup-on signal and the wakeup-off signal may be different logic level signals, for example, a high-level signal with a high voltage or a low-level signal with a low voltage. The wakeup-on signal and the wakeup-off signal may be transmitted via a single communication line.

A logic level signal may be transmitted or received via, for example, a complementary metal-oxide-semiconductor (CMOS) or a transistor to transistor logic (TTL) circuit.

While a logic level signal is being transmitted or received, a clock for reading a signal may not be transmitted or received.

A wakeup-on signal and a wakeup-off signal for the data driving device 120 may be produced by the data processing device 140, and may be transmitted to the data driving device 120. The receiving circuit 223 of the data driving device 120 may receive a wakeup-on signal and a wakeup-off signal from the data processing device 140.

In addition, when image data corresponding to the amount of one frame is all received in the normal mode, the control circuit 222 may determine that data reception is complete. In addition, the control circuit 222 may enter the low-power mode again.

As described above, the control circuit 222 may operate in the low-power mode while not receiving image data, may enter the normal mode when reception of image data begins, and may maintain the normal mode until the reception of the image data is complete. For example, the control circuit 222 may maintain the normal mode from the start of training until reception of the image data is complete. In addition, the control circuit 222 may enter the low-power mode again only after the reception of the image data is complete.

The training circuit 221 may train a signal including a test clock in the normal mode. The data driving device 120 may receive a clock-embedded image signal corresponding to image data. Before beginning reception of image data, the training circuit 221 may identify whether a clock embedded for a test is normally extracted in a training process.

The training circuit 221 may produce a lock-on signal if the training circuit 221 completes training associated with a test clock, or may produce a lock-off signal indicating unlocking. If the training circuit 221 produces a lock-off signal, the training circuit 221 may perform training again.

The receiving circuit 223 may receive image data. Particularly, the receiving circuit 223 may receive image data when training associated with a test clock is complete.

The transmitting circuit 224 may transmit a training result to the receiving circuit 243 of the data processing device 140. The training result may include a lock-on signal indicating completion of training associated with the test clock or a lock-off signal indicating unlocking.

The data processing device 140 may include a control circuit 241, a transmitting circuit 242, and a receiving circuit 243.

The control circuit 241 of the data processing device 140 may operate in the low-power mode while not transmitting image data. Subsequently, the control circuit 241 may enter the normal mode in order to transmit image data. When transmission of image data is complete, the control circuit 241 may enter the low-power mode again.

When receiving a wakeup-on signal, the control circuit 222 may enter the low-power mode from the off-mode. When receiving a wakeup-off signal, the control circuit 222 may enter the normal mode from the low-power mode.

Here, the off-mode may be the state in which power is not supplied to the data processing device 140 and the data processing device 140 is turned off, or may be the state in which only power which enables the minimum operation of the data processing device 140 is supplied before high-speed image data transmission.

A wakeup-on signal may enable the data processing device 140 in the off-mode to operate in the low-power mode. A wakeup-off signal may enable the data processing device 140 in the low-power mode to operate in the normal mode. The wakeup-on signal and the wakeup-off signal may be different logic level signals, for example, a high-level signal with a high voltage or a low-level signal with a low voltage. The wakeup-on signal and the wakeup-off signal may be transmitted via a single communication line.

The wakeup-on signal and the wakeup-off signal for the data processing device 140 may be produced by the control circuit 241, or may be received from an external circuit, for example, a host.

As described above, the control circuit 241 may operate in the low-power mode while not transmitting image data, may enter the normal mode when transmission of image data begins, and may maintain the normal mode until the transmission of the image data is complete. For example, the control circuit 222 may maintain the normal mode from the start of receiving a training result until the transmission of the image data is complete. In addition, the control circuit 222 may enter the low-power mode again only after the transmission of the image data is complete.

The receiving circuit 243 may receive the training result associated with a signal including a test clock from the transmitting circuit 224 of the data driving device 120 in the normal mode. The training result may include a lock-on signal indicating completion of training associated with the test clock or a lock-off signal indicating unlocking. If the training result includes a lock-off signal, the receiving circuit 223 may receive a training result again.

The transmitting circuit 242 may transmit image data in the normal mode. The transmitting circuit 242 may transmit a wakeup-on signal and a wakeup-off signal for the data driving device 120 to the receiving circuit 223 of the data driving device 120.

In addition, the transmitting circuit 242 may transmit a signal that enables or disables the low-power mode of the data driving device 120. An enable signal or a disable signal may be transmitted, together with image data including a clock embedded therein, to the data driving device 120.

When comparing an image signal and a logic-level signal, the image signal may be transmitted or received according to a differential scheme via two communication lines, and the logic-level signal may be transmitted or received via one of the two communication lines.

The image signal may be transmitted or received in a high speed when compared to the logic level signal, may have a relatively low signal level, and may need to transmit or receive a clock for reading data. Conversely, the logic level signal may be transmitted or received in a low speed, may have a relatively high signal level, and may not need to transmit or receive a clock for reading data.

A clock may be transmitted by being embedded in an image signal, and the receiving circuit 243 of the data driving device 120 may include a clock recovery circuit for recovering an embedded clock. The data driving device 120 may drive the clock recovery circuit in the normal mode, and may drive the clock recovery circuit using a low power in the low-power mode, for example, by blocking a driving power of the clock recovery circuit.

In the case of changing the low-power mode to the normal mode, clock training needs to be performed again and thus, a test clock may be transmitted in the initial stage of the normal mode.

Figure 3:
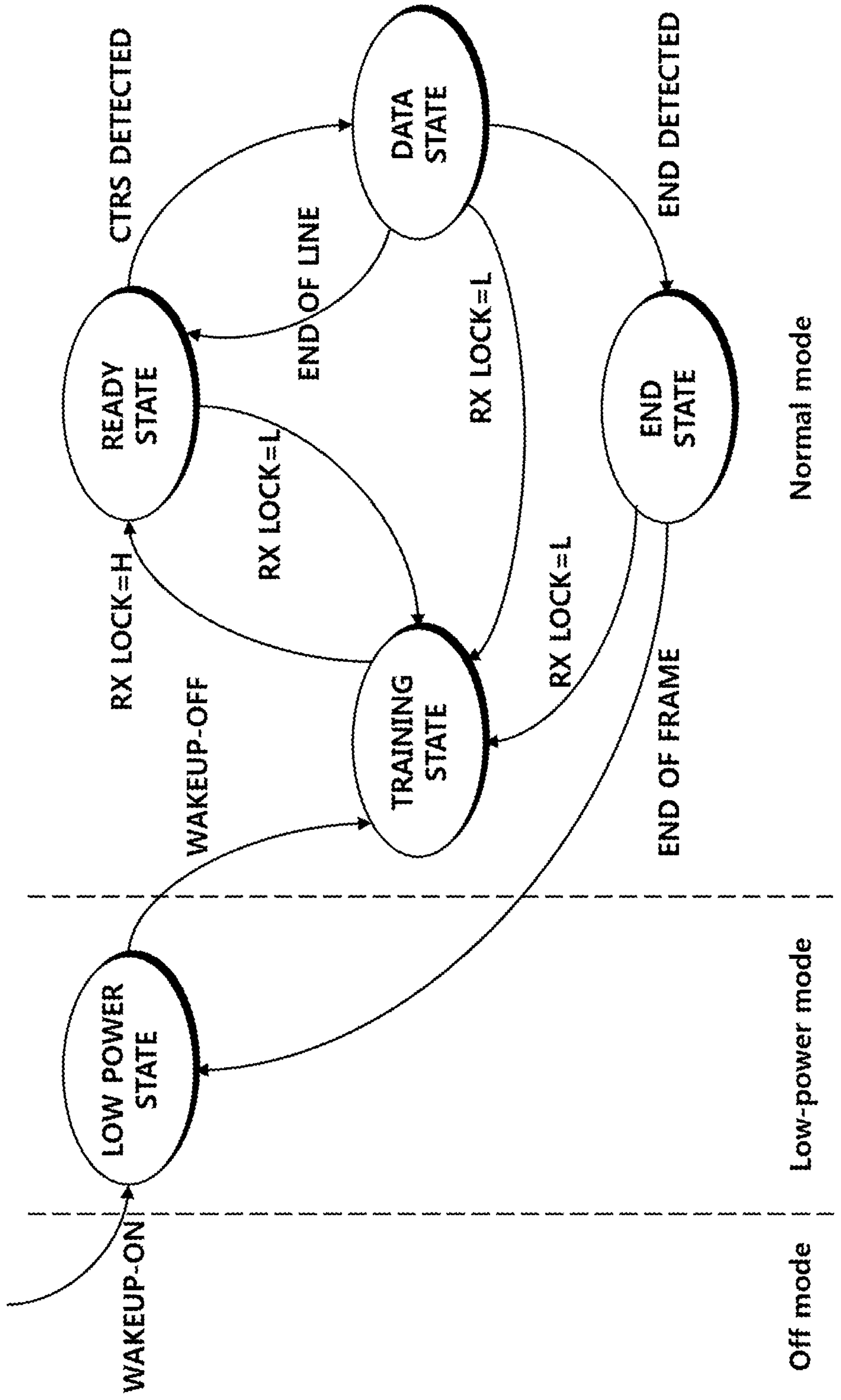
FIG. 3 is a state diagram illustrating operation of a data driving device according to an embodiment.

FIG. 3 is a state diagram illustrating operation of a data driving device 120 according to an embodiment.

Referring to FIG. 3, the data driving device 120 may operate in each of an off-mode, a low-power mode, and a normal mode.

If a wakeup-on signal is transmitted in a single communication line in the off-mode, the data driving device 120 in the off-mode may enter the low-power mode (WAKEUP-ON).

The data driving device 120 may be always standing by in the low-power mode while not receiving image data (LOW POWER STATE).

If a wakeup-off signal is transmitted in the single communication line in the low-power mode, the data driving device 120 in the low-power mode may enter the normal mode (WAKEUP-OFF).

If the data driving device 120 enters the normal mode, the data driving device 120 may perform training (TRAINING STATE).

If a training result corresponds to lock-on, the data driving device 120 may prepare reception of image data. The image data may be a clock-embedded differential signal (RX LOCK=H). The data driving device 120 may be standing by for reception of image data (READY STATE).

If unlocking is performed while the data driving device 120 is standing by for reception of image data, the data driving device may perform training again (RX LOCK=L).

The data driving device 120 may set an internal register in order to receive image data (CTRS DETECTED). The data driving device 120 may be standing by for reception of subsequent image data if the data driving device 120 receives image data corresponding to an one line (END of LINE).

If it is determined that the data driving device 120 completely receives the image data (END DETECTED), the data driving device 120 may terminate reception of the image data (END STATE).

If unlocking is performed while the data driving device 120 terminates the reception of the image data, the data driving device 120 may perform training again (RX LOCK=L).

If the image data is all received up to the last line of one frame (END OF FRAME), the data driving device 120 may enter again the low-power mode (LOW POWER STATE).

Figure 4:
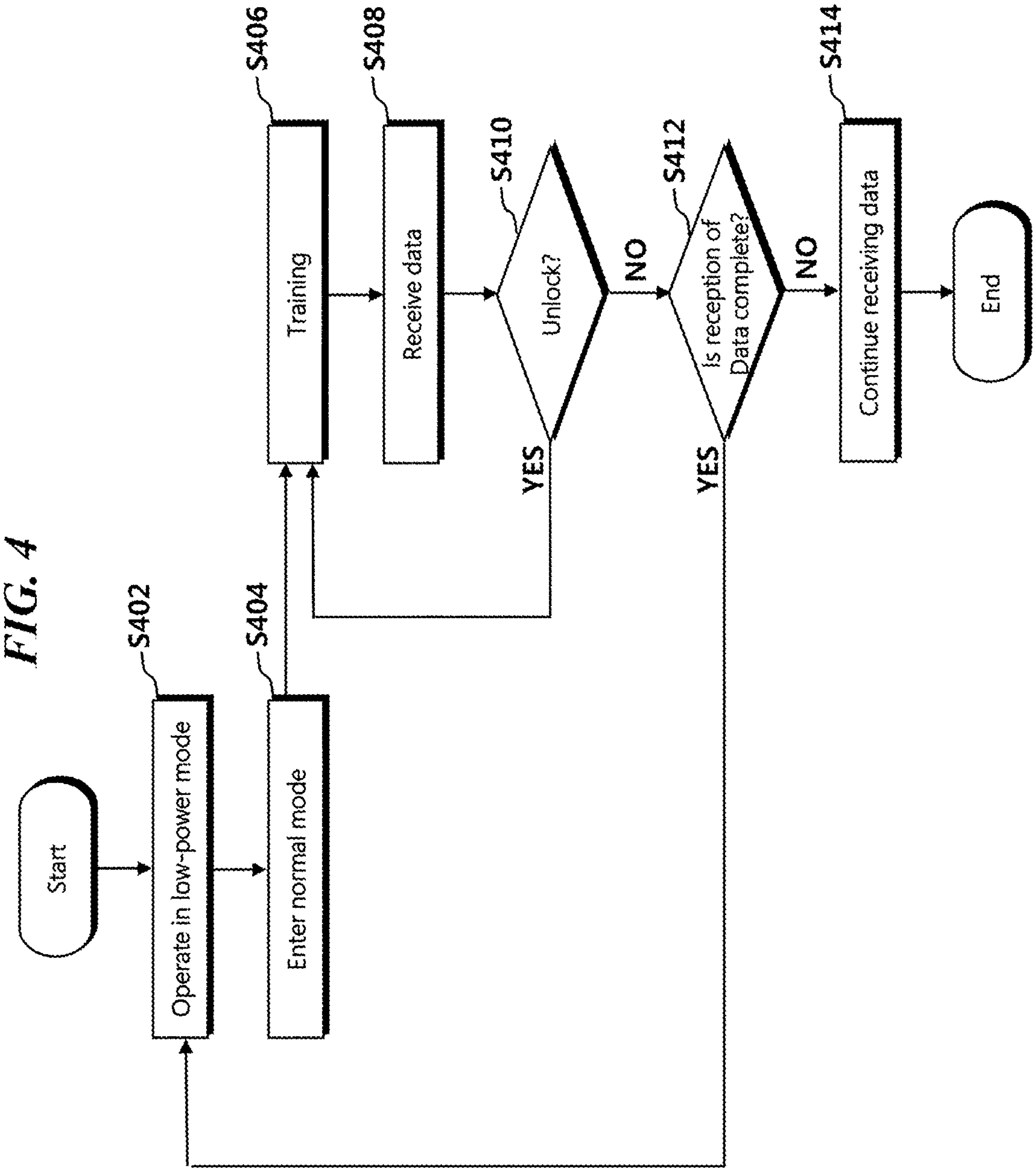
FIG. 4 is a flowchart illustrating operation of a data driving device according to an embodiment.

FIG. 4 is a flowchart illustrating operation of a data driving device 120 according to an embodiment.

Referring to FIG. 4, the data driving device 120 may operate in a low-power mode while not receiving image data in operation S402.

The data driving device 120 in the low-power mode may enter a normal mode in order to receive image data in operation S404.

The data driving device 120 may perform training of a signal including a test clock in the normal mode in operation S406.

When training is complete, the data driving device 120 may receive image data from a data processing device 140 in operation S408.

The data driving device 120 may determine whether unlocking is performed while receiving the image data in operation S410. When unlocking is performed in operation S410 (YES), the data driving device 120 may perform training again. If unlocking is not performed and the locked state is still continued in operation S410 (NO), the data driving device 120 may continue to receive the image data.

The data driving device 120 may determine whether the reception of the image data is complete in operation S412. If the data driving device 120 completely receive the image data in operation S412 (YES), the data driving device 120 may enter the low-power mode again and may reduce the amount of power consumed. When the reception of the image data is incomplete in operation S412 (NO), the data driving device may continue to receive the image data in operation S414.

Figure 5:
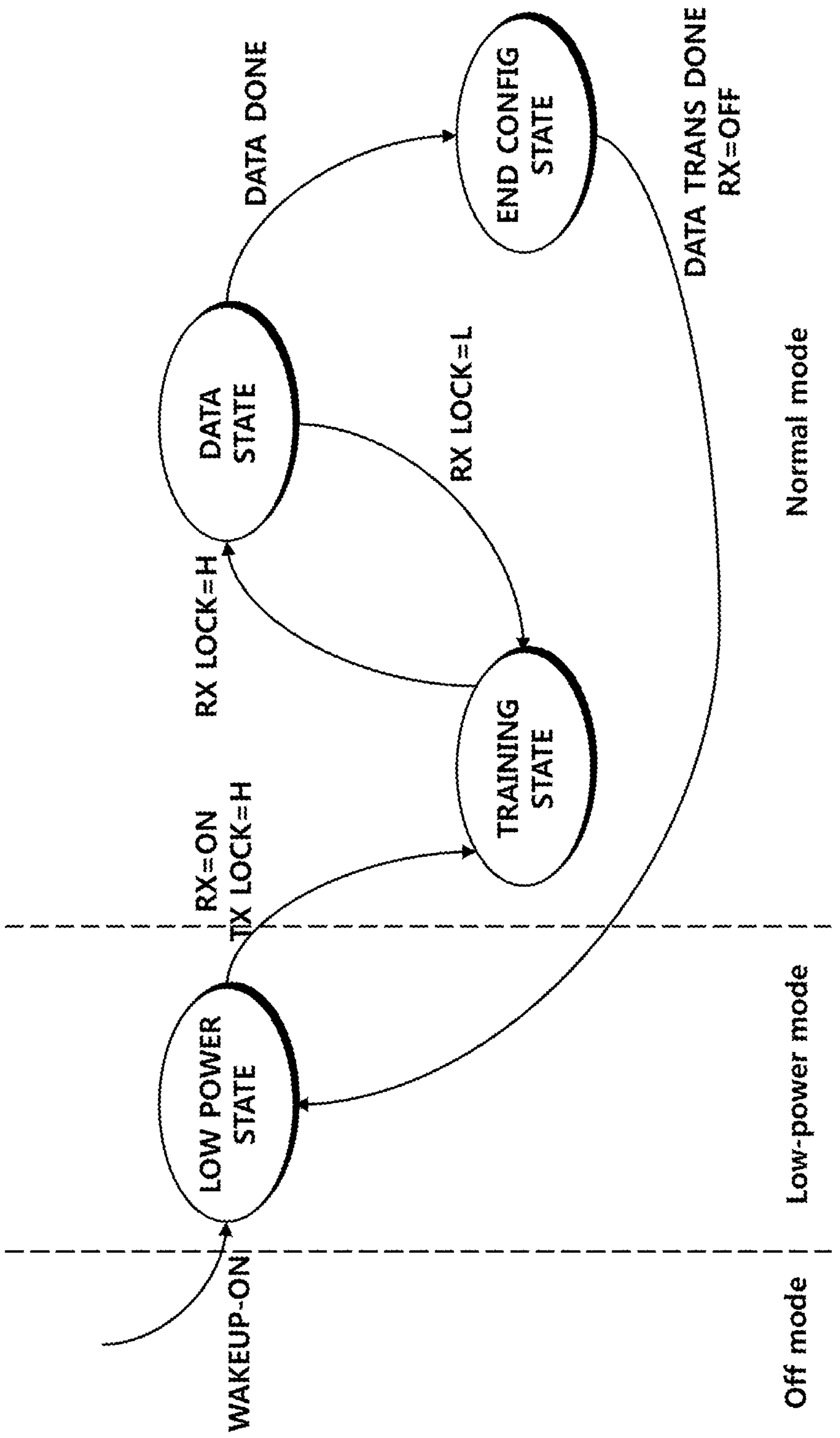
FIG. 5 is a state diagram illustrating operation of a data processing device according to an embodiment.

FIG. 5 is a state diagram illustrating operation of a data processing device 140 according to an embodiment.

Referring to FIG. 5, the data processing device 140 may operate in each of an off-mode, a low-power mode, and a normal mode.

If a wakeup-on signal is transmitted in a single communication line in the off-mode, the data processing device 140 in the off-mode may enter the low-power mode (WAKEUP-ON).

The data processing device 140 may be always standing by in the low-power mode while not receiving image data (LOW POWER STATE).

If the data processing device 140, which is a transmission end, prepares training, and the data driving device 120, which is a reception end, operates in the normal mode (RX=ON/TX LOCK=H), the data processing device 140 may prepare reception of a training result from the data driving device (TRAINING STATE).

The data processing device 140 may receive a lock-on signal, indicating completion of training performed by the data driving device 120, from the data driving device 120. When training is complete, the data processing device 140 may transmit image data to the data driving device 120. The image data may be a clock-embedded differential signal (RX LOCK=H).

The data processing device 140 may continue to transmit image data (DATA STATE). When the image data is completely transmitted, the data processing device 140 may terminate the transmission of the image data (DATA DONE/END CONFIG STATE).

If the transmission of the image data is terminated, or the data driving device 120, which is a reception end, is turned off, the data processing device 140 may operate in the low-power mode again (DATA TRANS DONE/RX=OFF).

Figure 6:
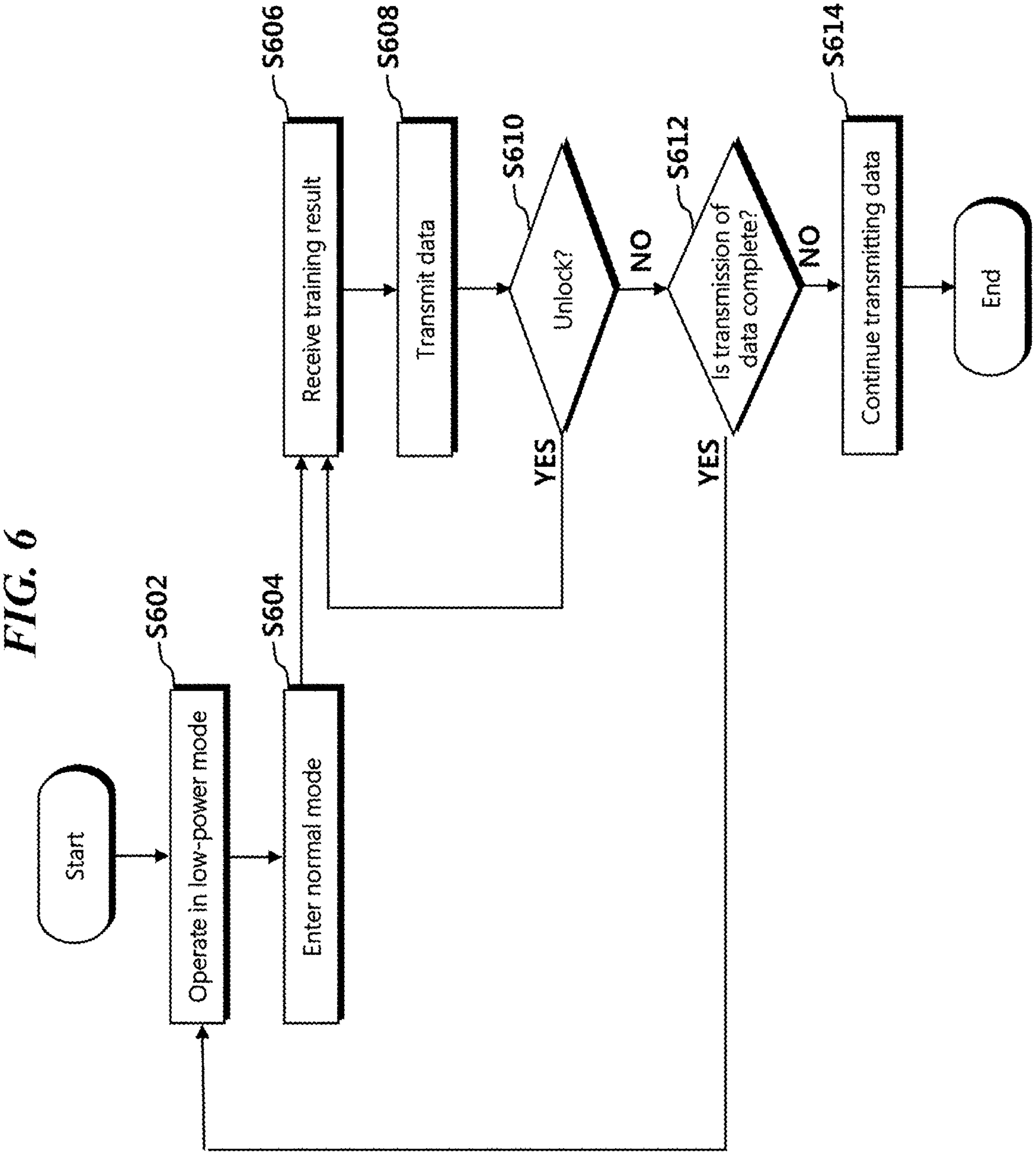
FIG. 6 is a flowchart illustrating operation of a data processing device according to an embodiment.

FIG. 6 is a flowchart illustrating operation of a data processing device according to an embodiment.

Referring to FIG. 6, the data processing device 140 may operate in a low-power mode while not transmitting image data in operation S602.

The data processing device 140 in the low-power mode may enter a normal mode in order to transmit image data in operation S604.

In the normal mode, the data processing device 140 may receive a training result that the data driving device 120 obtains by training a signal including a test clock, in operation S606.

When training is complete, the data processing device 140 may transmit image data to the data driving device 120 in operation S608.

The data processing device 140 may determine whether unlocking is performed while transmitting the image data in operation S610. The data processing device 140 may receive a signal associated with locking from the data driving device 120, and may determine whether unlocking is performed. When unlocking is performed in operation S610 (YES), the data processing device 140 may receive a training result again. If unlocking is not performed and the locked state is still continued in operation S610 (NO), the data processing device 140 may continue to transmit the image data.

The data processing device 140 may determine whether the transmission of the image data is complete in operation S612. If the data processing device 140 completely transmits the image data in operation S612 (YES), the data processing device 140 may enter the low-power mode again and may reduce the amount of power consumed. When the transmission of the image data is incomplete in operation S612 (NO), the data processing device 140 may continue to transmit the image data in operation S614.

Figure 7:
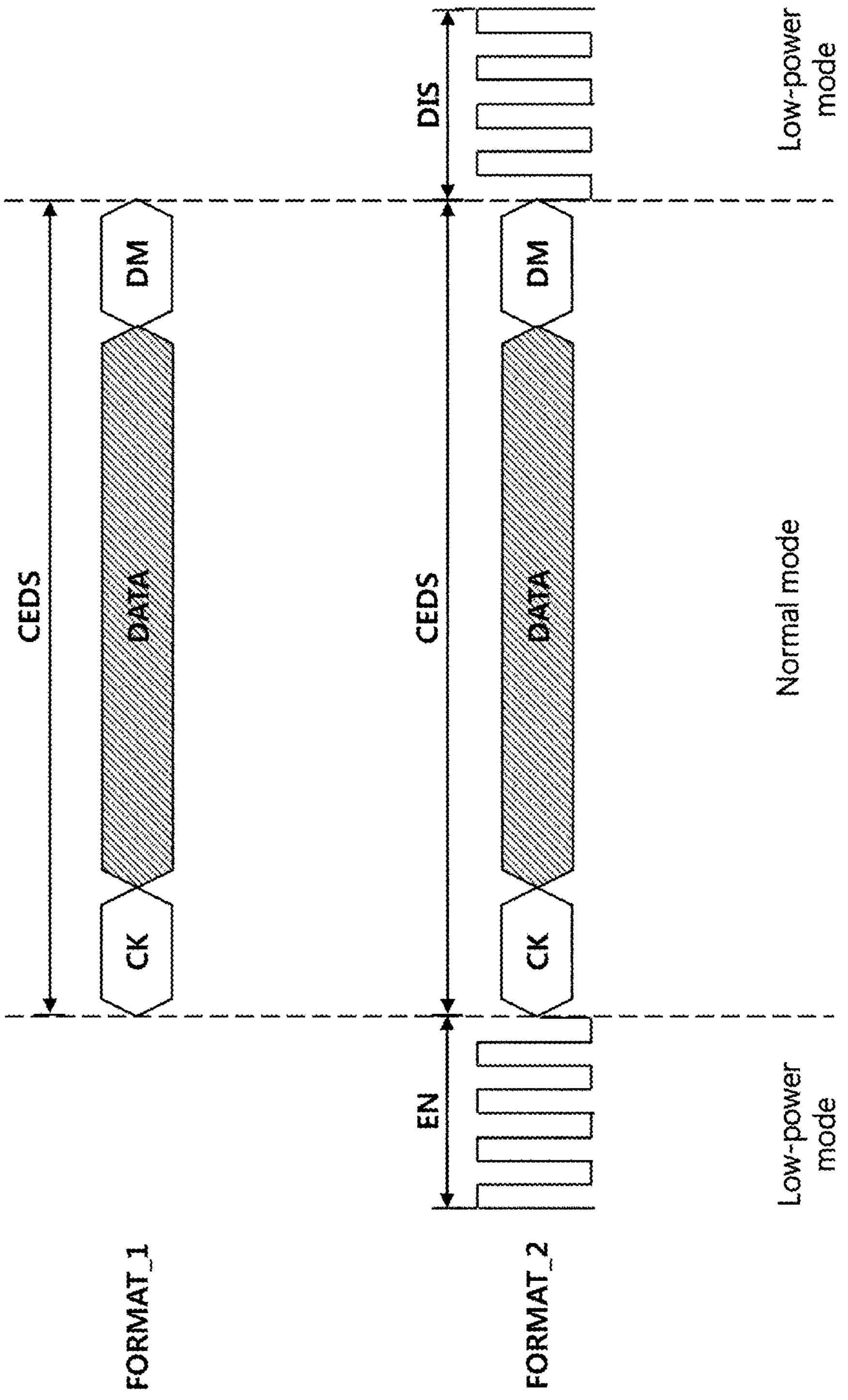
FIG. 7 is a diagram illustrating a signal transmitted or received between a data driving device and a data processing device according to an embodiment.

FIG. 7 is a diagram illustrating a signal transmitted or received between a data driving device 120 and a data processing device 140 according to an embodiment.

Referring to FIG. 7, a first format (FORMAT_1) is associated with image data which is transmitted or received between the data driving device 120 and the data processing device 140 conventionally, and a second format (FORMAT_2) is associated with image data which is transmitted or received between the data driving device 120 and the data processing device 140 according to an embodiment. The data processing device 140 may transmit a signal, provided in the first format (FORMAT_1) or the second format (FORMAT_2), to the data driving device 120.

Conventionally, image data may include a clock embedded therein, as shown in the first format (FORMAT_1). A signal from a clock area (CK) to a dummy area (DM) may be referred to as a clock-embedded differential signal (CEDS) (e.g., a clock-embedded signal). The clock area (CK) including a clock may be located in one side of a data area (DATA). The dummy area (DM) may be located in the other side of the clock area (CK).

According to an embodiment, an enable (EN) signal and a disable (DIS) signal may be added to a CEDS signal, as shown in the second format (FORMAT_2). The enable signal may enable the data driving device to operate in the low-power mode. Conversely, the disable signal may terminate the low-power mode, and may enable the data driving device to operate in the off-mode or the normal mode. Although the enable signal and the disable signal may include a wakeup-on signal or a wakeup-off signal for the data driving device, the present disclosure is not limited thereto, and the signals may be independent therefrom and may determine the low-power mode of the data driving device.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method for receiving data in a first integrated circuit, the method comprising:

receiving a logic level signal at a first transmission rate, through a differential communication line comprising a plurality of communication lines, from a second integrated circuit;

in response to receiving the logic level signal, receiving a training signal, through the differential communication line, from the second integrated circuit; and in response to completion of training based on the training signal, receiving data at a second transmission rate, through the differential communication line, from the second integrated circuit, wherein the second transmission rate for image data is higher than the first transmission rate for the logic level signal without the image data, and the data at the second transmission rate comprises the image data.

2. The method of claim 1, wherein the logic level signal corresponds to a transistor-transistor logic (TTL) signal or a complementary metal oxide semiconductor (CMOS) signal.

3. The method of claim 1, wherein the first integrated circuit receives the logic level signal in a low power mode.

4. The method of claim 3, wherein the first integrated circuit converts from the low power mode to a normal mode, in response to receiving the logic level signal.

5. The method of claim 3, wherein the first integrated circuit controls a driving power of a clock recovery circuit in the low power mode.

6. The method of claim 1, wherein the first integrated circuit trains a signal using the training signal.

7. The method of claim 4, wherein the first integrated circuit converts from the normal mode to the low power mode, in response to completion of the receiving the data.

8. The method of claim 7, wherein, when data corresponding to an end of frame is received, the first integrated circuit determines that data reception is completed.

9. The method of claim 4, wherein the first integrated circuit converts from the normal mode to the low power mode, in response to receiving a signal corresponding to a conversion of a mode, through the differential communication line, from the second integrated circuit.

10. A method for transmitting data in a first integrated circuit, the method comprising:

transmitting a logic level signal at a first transmission rate, through a differential communication line comprising a plurality of communication lines, to a second integrated circuit;

transmitting a training signal, through the differential communication line, to the second integrated circuit; and in response to completion of training based on the training signal, transmitting data at a second transmission rate, through the differential communication line, to the second integrated circuit, wherein the second transmission rate for image data is higher than the first transmission rate for the logic level signal without the image data-, and the data at the second transmission rate comprises the image data.

11. The method of claim 10, wherein the logic level signal corresponds to a transistor-transistor logic (TTL) signal or a complementary metal oxide semiconductor (CMOS) signal.

12. The method of claim 10, wherein the first integrated circuit determines the completion of the training, based on receiving a signal corresponding to a result of the training from the second integrated circuit.

13. A first integrated circuit configured to receive data, the first integrated circuit comprising:

a control circuit configured to control conversion from a low power mode to a normal mode, based on a logic level signal at a first transmission rate received from a second integrated circuit through a differential communication line comprising a plurality of communication lines;

a training circuit configured to train a signal based a training signal received from the second integrated circuit, in the normal mode; and a receiving circuit configured to receive data at a second transmission rate, through the differential communication line, from the second integrated circuit, in response to completion of training based on the training signal, wherein the second transmission rate for image data is higher than the first transmission rate for the logic level signal without the image data, and the data at the second transmission rate comprises the image data.

14. The first integrated circuit of claim 13, wherein the logic level signal corresponds to a transistor-transistor logic (TTL) signal or a complementary metal oxide semiconductor (CMOS) signal.

15. The first integrated circuit of claim 13, wherein the first integrated circuit is configured to control a driving power of a clock recovery circuit in the low power mode.

* * * * *